(12) United States Patent
Buccella

(10) Patent No.: US 8,041,555 B2
(45) Date of Patent: Oct. 18, 2011

(54) LANGUAGE TRANSLATION BASED ON A LOCATION OF A WIRELESS DEVICE

(75) Inventor: Christopher J. Buccella, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 11/839,075

(22) Filed: Aug. 15, 2007

(65) Prior Publication Data

US 2009/0048820 A1   Feb. 19, 2009

(51) Int. Cl.
*G06F 17/28* (2006.01)

(52) U.S. Cl. .................................. 704/2; 704/10

(58) Field of Classification Search .............. 704/1–10
See application file for complete search history.

(56) References Cited

U.S. PATENT DOCUMENTS

| | | | |
|---|---|---|---|
| 5,701,497 A * | 12/1997 | Yamauchi et al. ............. | 704/3 |
| 6,385,586 B1 * | 5/2002 | Dietz ............................ | 704/277 |
| 6,473,523 B1 | 10/2002 | Newman et al. | |
| 7,353,033 B2 * | 4/2008 | Kwon ............................ | 455/456.3 |
| 7,386,437 B2 * | 6/2008 | Brulle-Drews ................ | 704/3 |
| 2002/0034960 A1 | 3/2002 | Muranaga ..................... | 455/517 |
| 2002/0046259 A1 * | 4/2002 | Glorikian ...................... | 709/218 |
| 2002/0090943 A1 * | 7/2002 | Kwon ............................ | 455/433 |
| 2002/0123880 A1 * | 9/2002 | Brown .......................... | 704/4 |
| 2002/0184003 A1 * | 12/2002 | Hakkinen et al. ............. | 704/8 |
| 2003/0023424 A1 * | 1/2003 | Weiner .......................... | 704/8 |
| 2003/0050776 A1 * | 3/2003 | Blair ............................. | 704/235 |
| 2003/0164819 A1 * | 9/2003 | Waibel .......................... | 345/173 |
| 2003/0202683 A1 * | 10/2003 | Ma et al. ....................... | 382/104 |
| 2004/0041925 A1 | 3/2004 | Shibutani | |
| 2006/0217954 A1 * | 9/2006 | Koyama et al. ............... | 704/2 |
| 2007/0112554 A1 * | 5/2007 | Goradia ........................ | 704/4 |
| 2008/0059152 A1 * | 3/2008 | Fridman et al. ............... | 704/9 |
| 2008/0086694 A1 * | 4/2008 | Mann et al. ................... | 715/744 |
| 2008/0221862 A1 * | 9/2008 | Guo et al. ..................... | 704/2 |
| 2008/0221879 A1 * | 9/2008 | Cerra et al. ................... | 704/235 |

FOREIGN PATENT DOCUMENTS

| | | |
|---|---|---|
| JP | 09-138802 | 5/1997 |
| JP | 11-295804 | 10/1999 |
| JP | 2000-023012 | 1/2000 |
| JP | 2003-141547 | 5/2003 |
| JP | 2004-282134 | 10/2004 |
| JP | 2005332014 A | * 12/2005 |

* cited by examiner

*Primary Examiner* — Abul K Azad
(74) *Attorney, Agent, or Firm* — Jon A. Gibbons; Fleit Gibbons Gutman Bongini & Bianco PL

(57) ABSTRACT

A method, information processing system, and wireless communication device that translate text within an image captured by a wireless device. At least one image (114) is received image from a wireless device (104). A location where the image (114) was captured by the wireless device (104) is determined. A set of text characters is identified (414) within the image (114). A language associated with the set of text characters is determined (416) based on at least the location that has been determined. The set of text characters is translated (418) into a language that is different than language that has been determined.

20 Claims, 4 Drawing Sheets

LANGUAGE TRANSLATION BASED ON A LOCATION OF A WIRELESS DEVICE

FIELD OF THE INVENTION

The present invention generally relates to the field of language translation, and more particularly relates to using optical character recognition on an image received from a portable device for performing language translation.

BACKGROUND OF THE INVENTION

Travelers or business people in foreign countries often have difficulty with the language barrier. On some occasions these non-native speaking people need a sign, posting, or the like translated. However, in many instances a native speaking individual is not available to perform the translation or is unwilling to do so. An individual can use a translation dictionary or an electronic translator, but these methods can be very time consuming and cumbersome. Furthermore, dictionaries and electronic translators are limited by their word sets. Another solution is to have the individual use the Internet to perform translations. However, the individual is required to access the Internet which may not be readily available to enter the phrase to be translated.

Therefore a need exists to overcome the problems with the prior art as discussed above.

SUMMARY OF THE INVENTION

Briefly, in accordance with the present invention, disclosed are a method, information processing system, and wireless communication system for translating text within an image captured by a wireless device. The method includes receiving at least one image is received image from a wireless device. A location where the image was captured by the wireless device is determined. A set of text characters is identified within the image. A language associated with the set of text characters is determined based on at least the location that has been determined. The set of text characters is translated into a language that is different than language that has been determined.

In another embodiment, an information processing system for translating text within an image captured by a wireless device is disclosed. The information processing system includes a processor and a memory that is communicatively coupled to the processor. The information processing system also includes a translation manager. The translation manager is adapted to receive at least one image from a wireless device. A location where the image was captured by the wireless device is determined. A set of text characters is identified within the image. A language associated with the set of text characters is determined based on at least the location that has been determined. The set of text characters is translated into a language that is different than language that has been determined.

In yet another embodiment, a wireless communication system for translating text within an image captured by a wireless device is disclosed. The wireless communication system includes a plurality of base stations and a plurality of wireless devices. Each of the wireless devices is communicatively coupled to at least one of the base stations. The wireless communication system also includes an information processing system that is communicatively coupled to at least one of the base stations. The information processing system includes a processor and a memory that is communicatively coupled to the processor. The information processing system also includes a translation manager. The translation manager is adapted to receive at least one image from a wireless device. A location where the image was captured by the wireless device is determined. A set of text characters is identified within the image. A language associated with the set of text characters is determined based on at least the location that has been determined. The set of text characters is translated into a language that is different than language that has been determined.

One advantage of the present invention is that an efficient and convenient language translation tool is provided to users. An individual is able to user his/her mobile phone as a tool for translating signs, postings, menus, and the like. An individual can capture an image of item to be translated using a camera on the mobile phone. The captured image is then sent to a server where the langue in the captured image is translated based on the location of the individual. The translation can then be sent back to the individual in a native language via email, SMS, MMS, EMS, voice call, and the like.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Translation System

Figure 1:
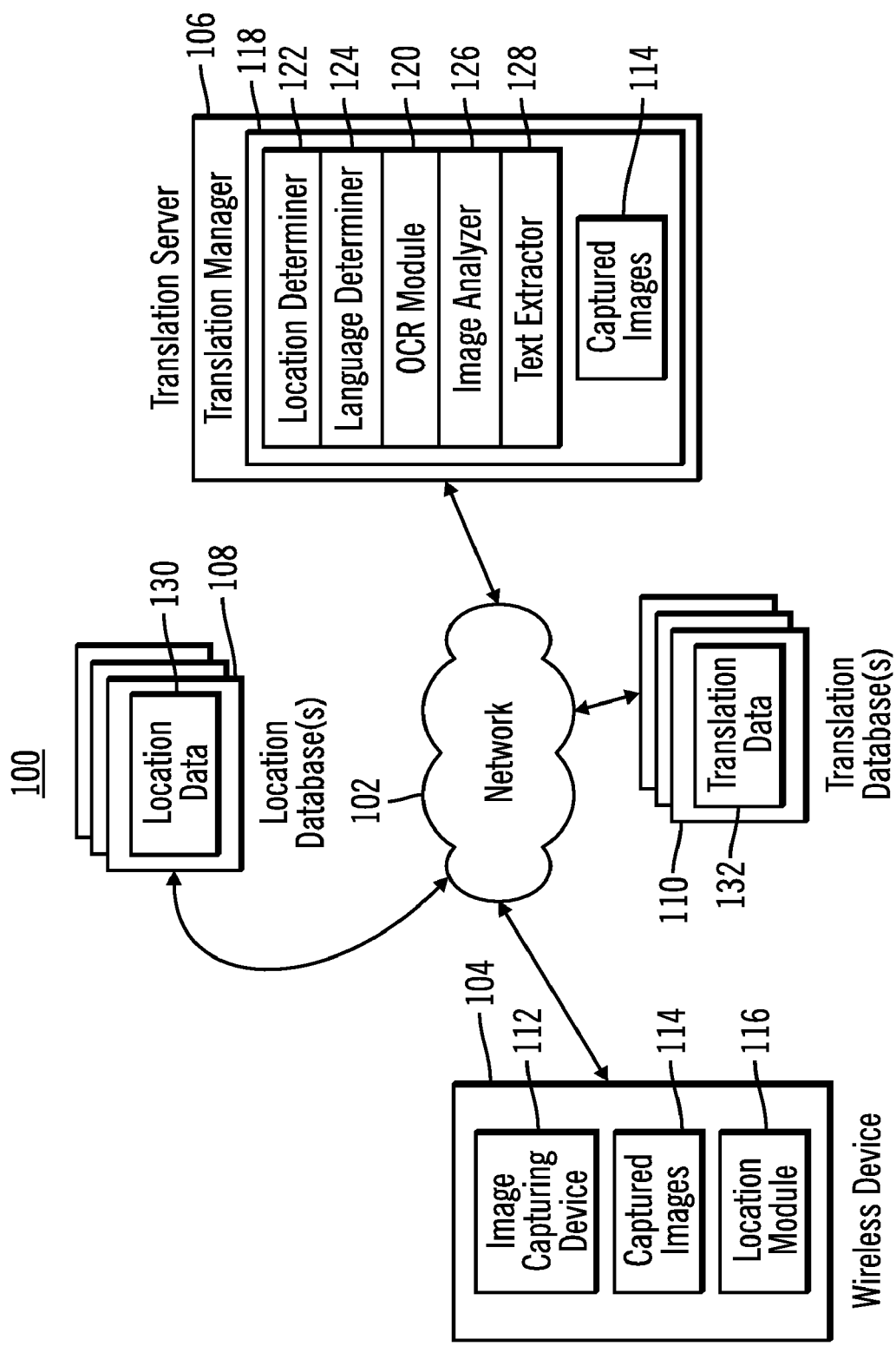
FIG. 1 is a block diagram illustrating a translation system according to an embodiment of the present invention.

FIG. 1 is a block diagram illustrating an exemplary language translation system 100 according to an embodiment of the present invention. The language translation system 100 of the present invention allows an individual to capture an image of an item comprising of words using his/her call phone and have those words translated into one or more different languages. The language translation system 100 comprises a network 102, which can be a wired and/or wireless network.

A wireless network can comprise a wireless communication network such as a Code Division Multiple Access network, Time Division Multiple Access network, Global System for Mobile Communications network, General Packet Radio Service network, Frequency Division Multiple Access network, Orthogonal Frequency Division Multiplexing network), Orthogonal Frequency Division Multiple Access network, Wireless LAN (WLAN), or the like. A wireless network can also comprise a Wireless LAN network, and/or a Wireless Wide Area Network.

Communicatively coupled to the network 102 are one or more wireless devices 104, information processing systems 106 such as a translation server 106, location databases 108, and translation databases 110. A wireless device 104 can include a cellular telephone, a mobile phone, a smartphone, a wireless messaging device, and the like. The wireless device 104, in one embodiment, comprises an image capturing device 112 such as a camera and captured images 114. The image capturing device 112 is used by an individual to capture, among other things, an image 114 of an item comprising words that the individual wants translated. For example, the individual may be at a train station and needs a sign translated. It should be noted that the present invention is applicable to item that includes letters or words such as signs, books, papers, postings, and the like.

The wireless device 104 also includes an optional location module 116 such as a GPS module that is used by the translation server 106 to determine the location of the wireless device 104. It should be noted that the wireless device 104 is not required to have a location module 116. For example, the translation server 106 can determine the location of the wireless device 104 via triangulation, user input, and the like. When a user needs a translation performed by the translation server 106, the captured images 114 can be annotated with location data obtained from the location module 116 and transmitted to the translation server 106 via email, MMS, and the like. For example, the captured images 114 can be annotated with GPS coordinates.

The translation server 106, in one embodiment, comprises a translation manager 118 and captured images 114 received from the wireless device 104. The translation manager 118 manages the translation of words and phrases within the captured images 114 and includes an OCR module 120, a location determiner 122 and a language determiner 124. The location determiner 122 determines the location of the wireless device 104 based on the location data associated with the captured images 114, triangulation, user input, and the like. The language determiner 124 determines the language of the words or phrases within the captured images 114. The OCR module 120 comprises an image analyzer 126 and text extractor 128 that are used for performing OCR on the captured images 114 received from the wireless device 104. The translation manager 118 and its components are discussed in greater detail below. It should be noted that the OCR module 120 can also reside outside of the translation manager 118.

The location database(s) 108 comprises location data 130 that is retrieved by the translation server 106 to determine the location of the wireless device 104. For example, based on GPS coordinates associated with a captured image 114, the translation server 106 can determine that the image 114 was taken inside of a bank in Switzerland. The location database 108 can comprise location data 130 that identifies countries, cities, towns, businesses, public locations such as train stations, landmarks, and the like. The translation databases 110 comprise translation data sets 132 for a plurality of languages. These translation data sets 132 are used by the translation manager 118 to perform translation functions on text extracted from the captured images 114 by the OCR module 120.

Language Translation for Images Captured by a Portable Device

The following is a more detailed discussion of the language translation referenced above with respect to FIG. 1. In one embodiment, a user encounters an item comprising a word(s) or phrase(s) that he/she wants to have translated. The user captures an image of the item using the imaging device 112 such as a camera on his/her wireless device 104. If the wireless device 104 includes a location module 116, location data can be attached to the captured image(s) 114. For example, GPS coordinates can be associated with the attached image. Alternatively, a user can manually enter his/her location such as an address, country, state, city, zip code, county, region, and the like. A user can also annotate the captured image 114 with a phone number of the location where the picture was taken or of a location near the picture's location. The phone number allows the translation server 106 to query the location database(s) 108 to obtain the location of the picture via the telephone number.

Once the translation server 106 receives the captured images 114 or portions of captured images selected by a user, the image analyzer 126 analyzes the captures image 114 to identify letters and symbols. The text extractor 128 the extracts the text identified in the image 114 by the image analyzer 126. The translation manager 120 analyzes the extracted text. The location determiner 122, in one embodiment, analyzes the image file 114 associated with the extracted text to determine if location data is present. For example, the location determiner 122 determines if GPS coordinates or user entered information such as a phone number, address, and the like are associated with the image file 114.

If location data is associated with the image/extracted text, the location determiner 122 queries the location database(s) 108 to determine a more detailed location of where the captured image was taken. For example, the location data 130 received from the location database 108 can identify that country, state, city, region, address, type of establishment such as a bank or a restaurant that the image was taken. It should be noted that the translation manager 118 can also perform the location determination prior to the OCR functions being performed. For example, when a captured image 114 is received from a wireless device 104 the translation manager 118 can perform the above process to identify the location where the image was taken.

In one embodiment, the user may not have attached any location information to the captured image 114. Therefore, the translation manager 118 can use triangulation to determine the location of the wireless device 104. For example, the translation manager 118 can query the wireless service provider of the wireless device 104 to obtain triangulation information or can query an E911 system to obtain triangulation information. An E911 system is a safety network used in various countries to provide safety personnel with the location of a wireless device 104. If the wireless device 104 comprises IP-based functionalities, the location determiner 122 can use the IP address of the wireless device 104 to determine the location of the access point where the wireless device 104 is currently registered. This gives the location determiner 122 an approximate location of the wireless device 104 since the range of an access point is limited. The location information obtained from these methods can also be sent to the location database(s) 108 to obtain more detailed location data 130 as discussed above.

Once the location of the wireless device 104 is determined, the language determiner 124 identifies the languages and/or dialects spoken at that determined location. For example, a user may be traveling in South America where both Spanish and Portuguese are spoken and in other examples various dialects of a language are spoken based on the region of a country. The location determiner 122, in this example, determines that a captured image was taken in Chile and that Spanish is spoken in Chile. The location determiner 122 can also determine that the image was captured within an establishment such as a bank. Therefore, the language determiner 124, in this example, determines that a specific language subset is to be used by the translation manager 118 that is focused on the banking industry. For example, knowing a specific location such as a bank, the translation manager 118 can generate a "prioritized dictionary" of words. In this example, a sub-dictionary of the top N financial terms can be prioritized higher than words related to microbiology and slightly above common language. Also, the term rate within this sub-dictionary indicates that it is more likely to be used as a noun rather than a verb. In one embodiment, the user can inform the translation manager 118 of the language as well.

One of the biggest difficulties in language translation is that one-to-one mapping of words between languages is not performed. This results in homonyms being a source of great confusion. Based on context, a good text translator can determine whether "buffalo" is being used as a noun or a verb. However, even the best text language translators cannot determine whether "Let's go to the bank" is referring to a financial institution or a riverside. In this example, "bank" is a noun homonym. The term "bank" can also be a verb homonym. One advantage of the present invention is that location information is used to perform translations. Therefore, the present invention, identifies that the term "bank" is can be referred to a financial district vs. state park in the noun sense and a financial district vs. airfield in the verb sense. Using the location information, the present invention, in this example, determines that the term "bank" is being used in the context of a financial institution.

In another embodiment, the language determiner 124 analyzes the characters of the text extracted from the captured image 114 by the OCR module 120. For example, the language determiner 124 can analyze a given number of characters for each word to determine the language or dialect of a language of extracted text. The location determination and character analysis provides an even more accurate translation system. For example, an individual may be in New York and wants a sign written in Chinese to be translated. Based on the location information of New York, the English language may be selected as the language for the sign even though the sign is in Chinese. However, analyzing the characters reveals that the sign is in Chinese. Therefore, the translation system 100 of the present invention can accurately select to proper language of the text to be translated. In one embodiment, the translation manager 118 can also determine a probability that the identified language is in fact the actual language. For example, if the translation manager 118 translated the extracted text using Language A when Language B was also a possibility, the translation manager 118 can inform the user that there is a 90% chance that the Language A is correct and that a 10% chance exists that the language is Language B.

In another embodiment, a historical log can be maintained at the wireless device 104 and/or the translation server 106 that tracks an individual's past translations requests. In this embodiment, when a captured image 114 is received at the translation server 106, the translation manager 118 determines the location of the wireless device 104 as discussed above. The translation manager 118 then analyzes the historical log to determine if a translation has been performed for the individual that is associated with the same location or a nearby location. If so, the historical log indicates what language was selected for the previous translation and is therefore used for the current translation.

For example, a user frequents a particular restaurant in Italy and has requested a translation while in the restaurant in the past. The historical log indicates that Italian was identified as the language to be used for a past translation associated with the restaurant. Therefore, if the user requests a translation while in the restaurant at some later point in time, the language determination process discussed above is not required. The translation manager 118 can retrieve the data from the historical log. A user profile can also be defined at the wireless device 104 and/or the translation server 106 that indicates what languages are to be used when performing a translation. I should be noted that the historical log is an optional component of the present invention and is not required.

In one embodiment, the translation manager 118 also verifies the reliability of the extracted text. For example, once the language of the extracted text is identified the translation manager 118 can process each extracted work to ensure that it conforms to a word within the identified language. In one embodiment, the translation server 106 comprises dictionaries for every language that this verification process can utilize. In another embodiment, the translation database(s) 110 comprises these dictionaries.

Once the language of the extracted text has been identified by the language determiner 122, the translation manager 118 utilizes translation data 132 retrieved from the translation database(s) 132 to translate the extracted text in a language selected by the user. The translation data 132 can include dictionary data for the identified language.

The translation server 106 then transmits the translation back to the wireless device 104. In one embodiment, the translation is processed by a text-to-speech module and a voice call is placed to the wireless device 104. When the user answers the call the translation is spoken to user in the translated language. In another embodiment, a text message, multimedia message, email, and the like can be sent to the wireless device 104 with the translation. These messages can include text and/or a sound file with the spoken translation.

It should be noted that the present invention is not limited to translating text only. For example, non-phrase content such as currency, units of measurement, and the like can be adjusted to make the user comfortable. An illustrative example is as follow. Consider a posting or menu comprising a particular beer in liters with a price in euros. The language in this example is German so "beer" is "bier". Aside from translating "bier" to "beer", an American might also like the units of measure converted to ounces or pints and the price converted to USD. The price in euro can also be displayed along with the price in USD as well. Having the price displayed in USD allows the individual to compare the price of the beer at that particular establishment to the price of beer where the individual resides.

As can be seen from the above discussion, the present invention provides an advantageous translation system. A user is no longer limited to pocket translation dictionaries and electronic translators. A user is able to capture an image of an item comprising text that the user wants to have translated. Location data can also be attached to the captured image. This captured image can then be sent via SMS, MMS, EMS, email, and the like to a translation server. The translation sever utilizes the location data associated with the captured image to determine the language of text within the captured image. Once the text from the captured image is extracted, the extracted text is translated according to the identified language. A user then receives the translated text via a voice call, SMS, MMS, EMS, email, or the like. This translation process provided by the present invention results in a more accurate and flexible translation.

Wireless Device

Figure 2:
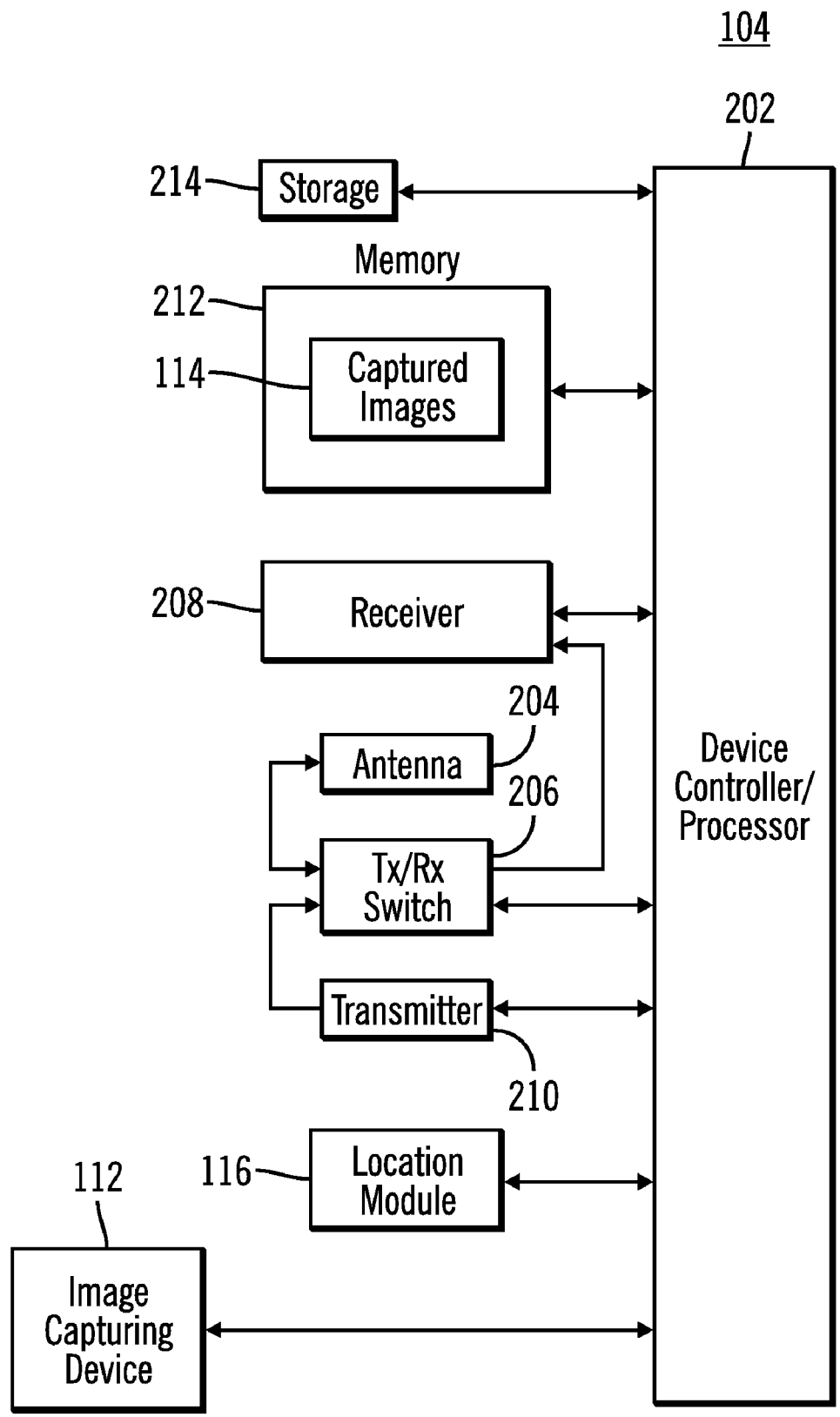
FIG. 2 is a block diagram illustrating a wireless device according to an embodiment of the present invention.

FIG. 2 is a block diagram illustrating a detailed view of the wireless device 104 according to an embodiment of the present invention. It is assumed that the reader is familiar with wireless communication devices. To simplify the present description, only that portion of a wireless communication device that is relevant to the present invention is discussed. The wireless device 104 operates under the control of a device controller/processor 202, that controls the sending and receiving of wireless communication signals. In receive mode, the device controller 202 electrically couples an antenna 204 through a transmit/receive switch 206 to a receiver 208. The receiver 208 decodes the received signals and provides those decoded signals to the device controller 202. In transmit mode, the device controller 202 electrically couples the antenna 204, through the transmit/receive switch 206, to a transmitter 210

The device controller 202 operates the transmitter and receiver according to instructions stored in the memory 212. These instructions include, for example, a neighbor cell measurement-scheduling algorithm. The memory 212, in one embodiment, also includes captured images. The wireless device 104, also includes non-volatile storage memory 214 for storing, for example, an application waiting to be executed (not shown) on the wireless device 104. A location module 116 and an image capturing device 112 are also electrically coupled to the device controller 202. These components have been discussed above in greater detail.

Information Processing System

Figure 3:
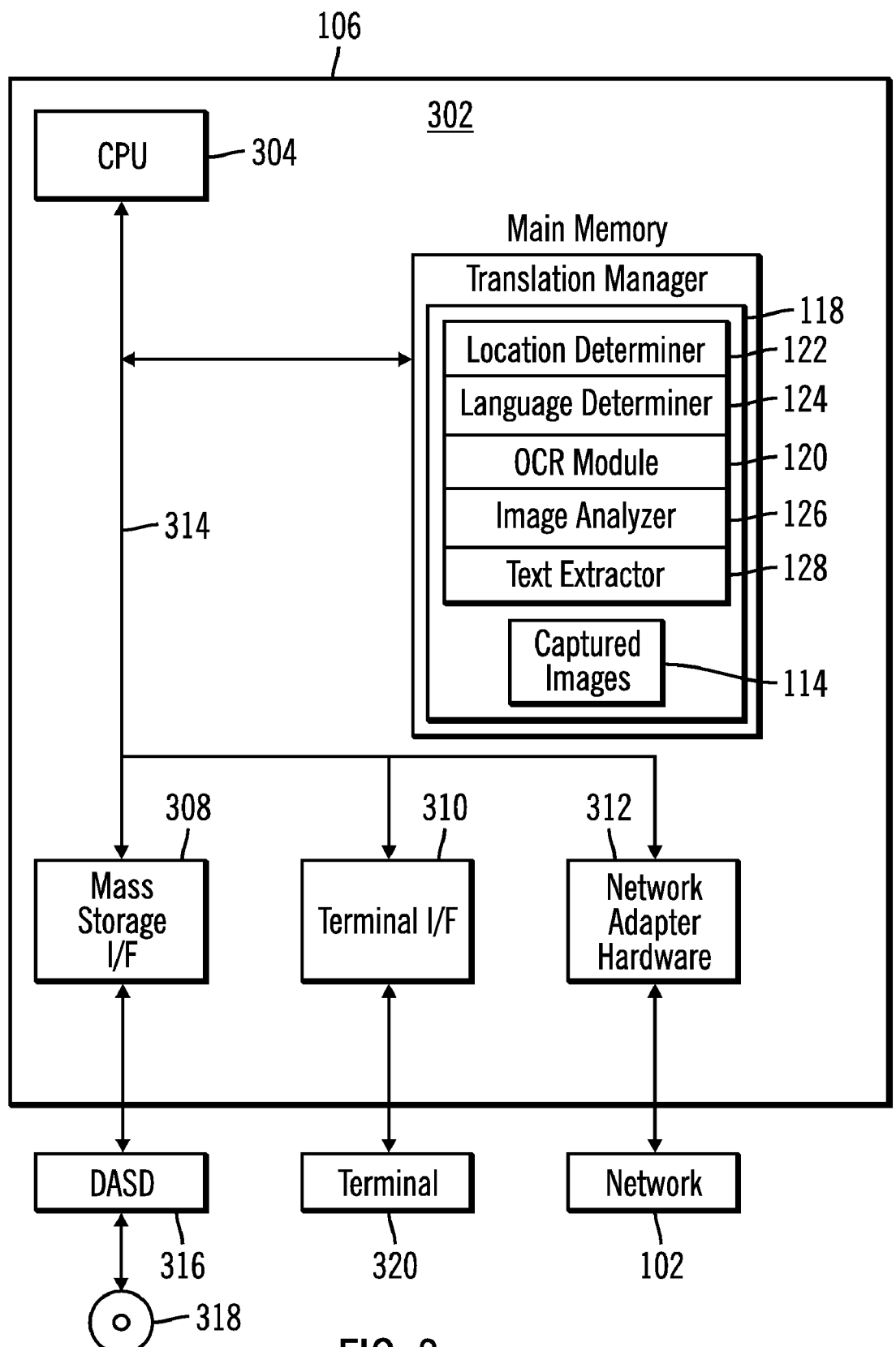
FIG. 3 is a block diagram illustrating an information processing system according to an embodiment of the present invention.

FIG. 3 is a block diagram illustrating a more detailed view of an information processing system 106 according to an embodiment of the present invention. The information processing system 106 is based upon a suitably configured processing system adapted to implement the exemplary embodiment of the present invention. Any suitably configured processing system is similarly able to be used as the information processing system 106 by embodiments of the present invention such as a personal computer, workstation, or the like.

The information processing system 106 includes a computer 302. The computer 302 has a processor 304 that is connected to a main memory 306, mass storage interface 308, terminal interface 310, and network adapter hardware 312. A system bus 314 interconnects these system components. The mass storage interface 308 is used to connect mass storage devices, such as data storage device 316, to the information processing system 106. One specific type of data storage device is a computer readable medium such as a floppy disk drive, which may be used to store data to and read data from a CD 318 or a floppy diskette (not shown). Another type of data storage device is a data storage device configured to support, for example, NTFS type file system operations.

The main memory 306, in one embodiment, comprises the translation manager 118, location determiner 122, language determiner 124, OCR module 120, image analyzer 126, text extractor 128, and captured images 114, all of which have been discussed above in greater detail. Although illustrated as concurrently resident in the main memory 306, it is clear that respective components of the main memory 306 are not required to be completely resident in the main memory 306 at all times or even at the same time. In one embodiment, the information processing system 106 utilizes conventional virtual addressing mechanisms to allow programs to behave as if they have access to a large, single storage entity, referred to herein as a computer system memory, instead of access to multiple, smaller storage entities such as the main memory 306 and data storage device 316. Note that the term "computer system memory" is used herein to generically refer to the entire virtual memory of the information processing system 106.

Although only one CPU 304 is illustrated for computer 302, computer systems with multiple CPUs can be used equally effectively. For example the wireless device itself can act as a computer system with the appropriate memory and CPU speed, eliminating the need for a separate server 114. Embodiments of the present invention further incorporate interfaces that each includes separate, fully programmed microprocessors that are used to off-load processing from the CPU 304. Terminal interface 310 is used to directly connect one or more terminals 320 to computer 302 to provide a user interface to the computer 302. These terminals 320, which are able to be non-intelligent or fully programmable workstations, are used to allow system administrators and users to communicate with the information processing system 106. The terminal 320 is also able to consist of user interface and peripheral devices that are connected to computer 302 and controlled by terminal interface hardware included in the terminal I/F 310 that includes video adapters and interfaces for keyboards, pointing devices, and the like.

An operating system (not shown) included in the main memory is a suitable multitasking operating system such as the Linux, UNIX, Windows XP, and Windows Server 2001 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 106. The network adapter hardware 312 is used to provide an interface to a network 102. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via CD or DVD, e.g. CD 318, CD ROM, or other form of recordable media, or via any type of electronic transmission mechanism.

Figure 4:
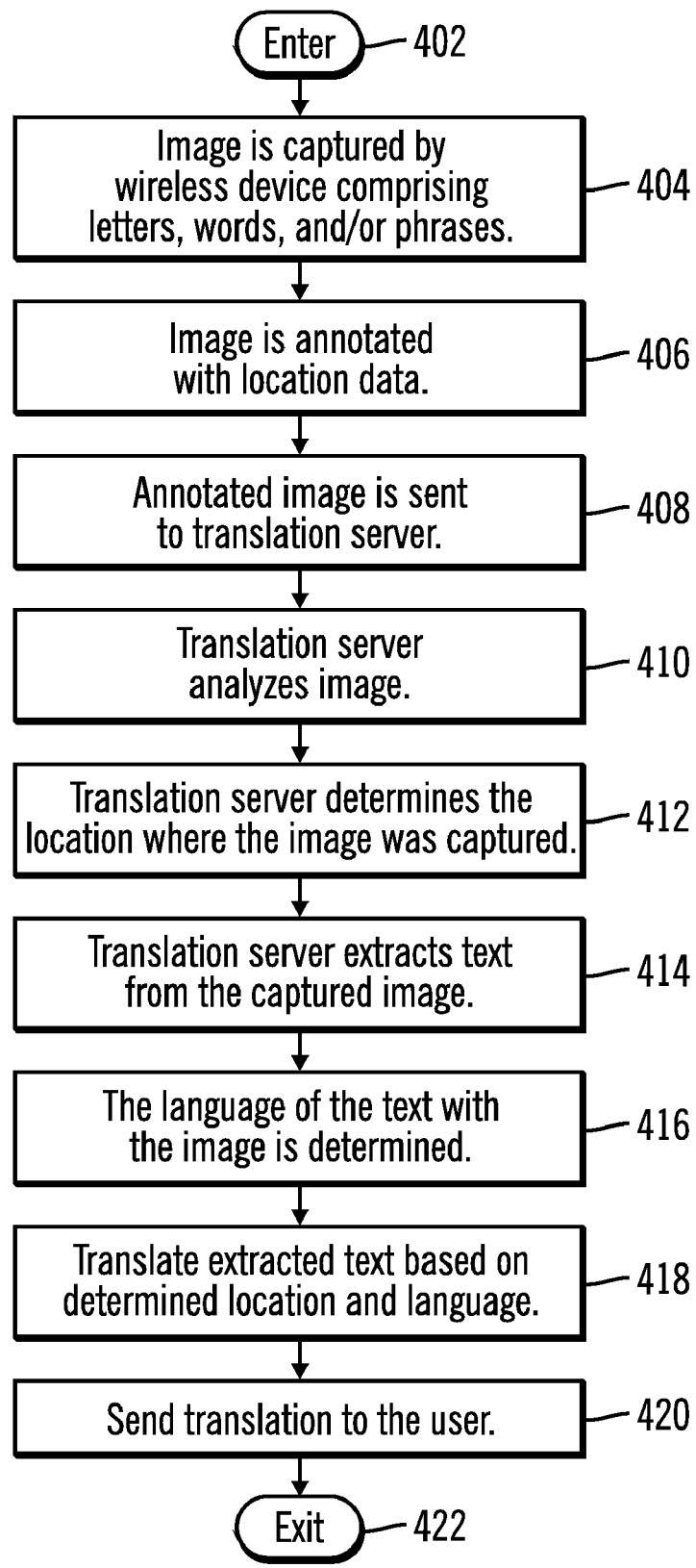
FIG. 4 is an operational flow diagram illustrating a process of translating text within a captured image received from a wireless device according to an embodiment of the present invention.

Process of Translating Text within a Captured Image Received from a Wireless Device FIG. 4 is an operational flow diagram illustrating a process of translating text within an image captured by a wireless device 104. The operational flow diagram of FIG. 4 begins at step 402 and flows directly to step 404. A user, at step 404, captures an image of an item comprising a letters, symbols, words, and/or phrases to be translated. The user and/or the wireless device 104, at step 406, annotates the image 114 with location data as discussed above. The annotated capture image 114, at step 408, is sent to the translation server 106 via text, email, or the like.

The translation server 106, at step 410, analyzes the image 114. The location of where the image 114 was taken, at step 412, is determined by the translation server 106 as discussed above. The translation server 106, at step 414, extracts the text within the image 114. The language of the text within the image 114, at step 416, is determined by the translation server 106. It should be noted that the language of the text within the image 114 can be determined either before or after the text is extracted, as discussed above. The translation server 106, at step 418, translates the extracted text based on the determined location and language. The translation, at step 420, is sent to the user via a text message, email, voice call, or the like. The control flow then exits at step 422.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with an information processing system, for translating text within an image captured by a wireless device, the method comprising:
   receiving at least one image from a wireless device;
      determining a location where the image was captured by the wireless device;
      identifying a set of text characters within the image;
      determining a language associated with the set of text characters based on at least the location that has been determined;
      determining a language context associated with the location that has been determined;
      identifying at least one word within a language dictionary associated with the language context;
      generating a prioritized language dictionary based on the at least one location and the language context that has been determined, wherein the generating comprises assigning a higher priority to the word associated with the language context than words in the language dictionary associated with other language contexts; and
      translating the set of text characters into a language that is different than language that has been determined based on the prioritized language dictionary that has been generated, wherein the word that has been assigned a higher priority is selected from the prioritized language dictionary to translate the set of text characters over other words in the prioritized language dictionary that have been assigned a lower priority.

2. The method of claim 1, further comprising:
   sending the set of characters that have been translated to the wireless device.

3. The method of claim 2, wherein the sending further comprises:
   placing a voice call to the wireless device where the translated set of characters is read to a user via a text-to-speech module.

4. The method of claim 3, wherein the sending further comprises:
   sending the translated set of characters to the wireless device by at least one of:
   an email message;
   a text message; and
   a multimedia message.

5. The method of claim 1, wherein the determining the language further comprises:
   analyzing a given number of characters in the set of characters to determine the language associated with the set of text characters.

6. The method of claim 1, wherein the determining the location further comprises:
   identifying location data associated with the image;
   querying a location database with the location data that has been identified; and
   receiving a location from the location database in response to the querying.

7. The method of claim 6, wherein the location data comprises at least one of:
   Global Positioning Satellite coordinates;
   wireless device triangulation data; and
   an Internet Protocol address associated with the wireless device.

8. The method of claim 1, wherein determining the location further comprises:
   analyzing a historical location database associated with the wireless device.

9. The method of claim 1, wherein the translating further comprises:
   identifying a type of establishment associated with the location that has been determined; and
   translating the set of text characters based on the type of establishment that has been identified.

10. An information processing system for translating text within an image captured by a wireless device, the information processing system comprising:
    a memory;
    a processor communicatively coupled to the memory;
    a translation manager communicatively coupled to the memory and the processor, wherein the translation manager is configured to perform a method comprising:
       receiving at least one image from a wireless device;
       determining a location where the image was captured by the wireless device;
       identifying a set of text characters within the image;
       determining a language associated with the set of text characters based on at least the location that has been determined;
       determining a language context associated with the location that has been determined;
       identifying at least one word within a language dictionary associated with the language context;
       generating a prioritized language dictionary based on the at least one location and the language context that has been determined, wherein the generating comprises assigning a higher priority to the word associated with the language context than words in the language dictionary associated with other language contexts; and
       translating the set of text characters into a language that is different than language that has been determined based on the prioritized language dictionary that has been generated, wherein the word that has been assigned a higher priority is selected from the prioritized language dictionary to translate the set of text characters over other words in the prioritized language dictionary that have been assigned a lower priority.

11. The information processing system of claim 10, wherein the translation manager is further adapted to:
    send the set of characters that have been translated to the wireless device.

12. The information processing system of claim 10, wherein the determining the language further comprises:

analyzing a given number of characters in the set of characters to determine the language associated with the set of text characters.

13. The information processing system of claim 10, wherein the determining the location further comprises:
identifying location data associated with the image;
querying a location database with the location data that has been identified; and
receiving a location from the location database in response to the querying.

14. The information processing system of claim 10, wherein the translating further comprises:
identifying a type of establishment associated with the location that has been determined; and
translating the set of text characters based on the type of establishment that has been identified.

15. A wireless communication system for translating text within an image captured by a wireless device, the wireless communication system comprising:
a plurality of base stations;
a plurality of wireless devices, wherein each wireless device in the plurality wireless devices is communicatively coupled to a base station in the plurality of base stations;
an information processing system communicatively coupled to at least one base station in the plurality of base stations; wherein the information processing system comprises:
a memory;
a processor communicatively coupled to the memory;
a translation manager communicatively coupled to the memory and the processor, wherein the translation manager is configured to perform a method comprising:
receiving at least one image from a wireless device;
determining a location where the image was captured by the wireless device;
identifying a set of text characters within the image;
determining a language associated with the set of text characters based on at least the location that has been determined;
determining a language context associated with the location that has been determined;
identifying at least one word within a language dictionary associated with the language context;
generating a prioritized language dictionary based on the at least one location and the language context that has been determined, wherein the generating comprises assigning a higher priority to the word associated with the language context than words in the language dictionary associated with other language contexts; and
translating the set of text characters into a language that is different than language that has been determined based on the prioritized language dictionary that has been generated, wherein the word that has been assigned a higher priority is selected from the prioritized language dictionary to translate the set of text characters over other words in the prioritized language dictionary that have been assigned a lower priority.

16. The wireless communication system of claim 15, wherein the translation manager is further adapted to:
send the set of characters that have been translated to the wireless device.

17. The wireless communication system of claim 15, wherein the determining the language further comprises:
analyzing a given number of characters in the set of characters to determine the language associated with the set of text characters.

18. The wireless communication system of claim 15, wherein the determining the location further comprises:
identifying location data associated with the image;
querying a location database with the location data that has been identified; and
receiving a location from the location database in response to the querying.

19. The wireless communication system of claim 18, wherein the location data comprises at least one of:
Global Positioning Satellite coordinates;
wireless device triangulation data; and
an Internet Protocol address associated with the wireless device.

20. The wireless communication system of claim 15, wherein the translating further comprises:
identifying a type of establishment associated with the location that has been determined; and
translating the set of text characters based on the type of establishment that has been identified.

* * * * *